United States Patent
Ali et al.

(10) Patent No.: US 10,372,800 B2
(45) Date of Patent: Aug. 6, 2019

(54) COGNITIVE SLIDE MANAGEMENT METHOD AND SYSTEM

(71) Applicant: International Business Machines Corporation, Armonk, NY (US)

(72) Inventors: Mariya Ali, Herndon, VA (US);
Rhonda L. Childress, Austin, TX (US);
Justin Grant, Atlanta, GA (US);
Michael Spisak, East Northport, NY (US)

(73) Assignee: International Business Machines Corporation, Armonk, NY (US)

(*) Notice: Subject to any disclaimer, the term of this patent is extended or adjusted under 35 U.S.C. 154(b) by 26 days.

(21) Appl. No.: 15/807,810

(22) Filed: Nov. 9, 2017

(65) Prior Publication Data
US 2019/0138579 A1  May 9, 2019

(51) Int. Cl.
*G06F 17/00* (2019.01)
*G06F 17/24* (2006.01)
*G06F 17/21* (2006.01)
*G06F 3/0484* (2013.01)
*G06F 16/438* (2019.01)
*G06F 3/16* (2006.01)
*G10L 17/00* (2013.01)
*G10L 17/22* (2013.01)

(52) U.S. Cl.
CPC .......... *G06F 17/24* (2013.01); *G06F 3/04845* (2013.01); *G06F 16/4393* (2019.01); *G06F 17/212* (2013.01); *G06F 3/167* (2013.01); *G10L 17/005* (2013.01); *G10L 17/22* (2013.01)

(58) Field of Classification Search
CPC .. G06F 17/211; G06F 17/248; G06F 17/2264; G06F 16/4393
See application file for complete search history.

(56) References Cited

U.S. PATENT DOCUMENTS

| | | | | |
|---|---|---|---|---|
| 7,677,896 B1* | 3/2010 | Sonwalkar | ............... | G09B 7/00 434/236 |
| 8,261,177 B2* | 9/2012 | Krishnaswamy | ........ | G06F 17/24 715/202 |
| 2003/0060284 A1* | 3/2003 | Hamalainen | ............. | G09B 7/02 463/42 |
| 2005/0223314 A1* | 10/2005 | Varadarajan | .......... | G06F 17/248 715/202 |
| 2007/0282948 A1* | 12/2007 | Praino | ..................... | G06Q 10/10 709/204 |
| 2007/0294619 A1* | 12/2007 | Krishnaswamy | ..... | G06F 17/211 715/704 |
| 2008/0178089 A1* | 7/2008 | Baker | ................... | G06F 17/248 715/732 |

(Continued)

*Primary Examiner* — Laurie A Ries
(74) *Attorney, Agent, or Firm* — Yee & Associates, P.C.; Jeffrey LaBaw

(57) ABSTRACT

A method, system, and computer program product for managing presentations. A user input defining content for a new presentation is received at a presentation manager in a drafting mode in a computer system. A slide for the new presentation using the user input, a presentation knowledgebase of presentations, and a presentation style profile defining a presentation style for a user is created. A context for the slide is defined, wherein the context aids in conveying a meaning intended by the user for the content. The slide is placed in the new presentation.

18 Claims, 10 Drawing Sheets

(56) References Cited

U.S. PATENT DOCUMENTS

| | | | | |
|---|---|---|---|---|
| 2009/0006660 A1* | 1/2009 | Bawcutt | H04L 65/4015 | 710/18 |
| 2009/0138332 A1* | 5/2009 | Kanevsky | G06Q 30/0201 | 705/7.29 |
| 2009/0254836 A1* | 10/2009 | Bajrach | G11B 27/031 | 715/745 |
| 2009/0327883 A1* | 12/2009 | Robertson | G06F 16/44 | 715/273 |
| 2009/0327896 A1* | 12/2009 | Pall | H04L 65/605 | 715/730 |
| 2010/0031152 A1* | 2/2010 | Villaron | G06F 3/0481 | 715/731 |
| 2010/0036929 A1* | 2/2010 | Scherpa | G06Q 10/10 | 709/207 |
| 2011/0022960 A1* | 1/2011 | Glover | G06Q 10/10 | 715/732 |
| 2012/0159403 A1* | 6/2012 | Capan | G06F 16/40 | 715/863 |
| 2012/0191716 A1* | 7/2012 | Omoigui | H01L 27/1463 | 707/740 |
| 2014/0237371 A1* | 8/2014 | Klemm | G06Q 10/109 | 715/730 |
| 2015/0121231 A1* | 4/2015 | Edwardson | G11B 27/034 | 715/732 |
| 2015/0324490 A1* | 11/2015 | Page | G05B 19/4183 | 700/98 |
| 2016/0026872 A1* | 1/2016 | Kannan | G06F 16/7867 | 382/107 |
| 2016/0246947 A1* | 8/2016 | Yao | G16H 10/20 | |
| 2017/0220535 A1* | 8/2017 | Olsen | G06F 17/24 | |
| 2017/0316091 A1* | 11/2017 | Edge | G06F 17/21 | |
| 2018/0233057 A1* | 8/2018 | Sitton | G09B 5/06 | |
| 2019/0065011 A1* | 2/2019 | Room | G06F 16/972 | |

* cited by examiner

COGNITIVE SLIDE MANAGEMENT METHOD AND SYSTEM

BACKGROUND

1. Field

The disclosure relates generally to an improved computer system and, more specifically, to a method, an apparatus, and a computer program product for managing the creation and presentation of slides.

2. Description of the Related Art

Presentations to audiences can be made with a slide deck displayed to the audience using a display device such as a monitor or a projector. The slide deck contains slides with content to be presented to the audience.

When a user needs to create a presentation, the user may have access to slide assets for their company, department, division, or other organization. The slide assets comprise slides for presentations that can be reused in new presentations. Access to these previously-created presentations can save time and effort.

However, the user may be unsure of the contextual detail of each slide in the different presentations. The user often desires to display content in the slide in a specific manner. For example, the user may desire to use graphics, bullets, charts, data grids, or other types of forms for presentation content. The selection may be based on the presentation style of the user, a target audience, or some other factor. As a result, it can be difficult for a user to easily use prior slides in creating a presentation that appeals to the presentation style of the user and target items for the presentation.

SUMMARY

According to one embodiment of the present invention, a method for managing presentations is present. A user input defining content for a new presentation is received at a presentation manager in a drafting mode in a computer system. A slide for the new presentation using the user input, a presentation knowledgebase of presentations, and a presentation style profile defining a presentation style for a user is created. A context for the slide is defined, wherein the context aids in conveying a meaning intended by the user for the content. The slide is placed in the new presentation.

According to another embodiment of the present invention, a cognitive presentation system is comprised of a computer system and a presentation manager. The presentation manager, running on the computer system in a drafting mode that receives a user input defining content for a new presentation, creates a slide for the new presentation using the user input using a presentation knowledgebase and a presentation style profile defines a presentation style for the user. The presentation manager; defines context for the slide, wherein the context aids in conveying a meaning intended by a user for the content. The presentation manager places the slide in the new presentation.

According to yet another embodiment of the present invention, a computer program product for managing presentations is present. The computer program product is comprised of a computer-readable storage media, first program code, second program code, third program code, and fourth program code. The first program code, stored on the computer-readable storage media, receives a user input defining content for a new presentation. The second program code creates a slide for the new presentation using the user input, a presentation knowledgebase, and a presentation style profile defining a presentation style for a user. The third program code defines context for the slide, wherein the context aids in conveying a meaning intended by the user for the content. The fourth program code places the slide in the new presentation.

DETAILED DESCRIPTION

Figure 1:
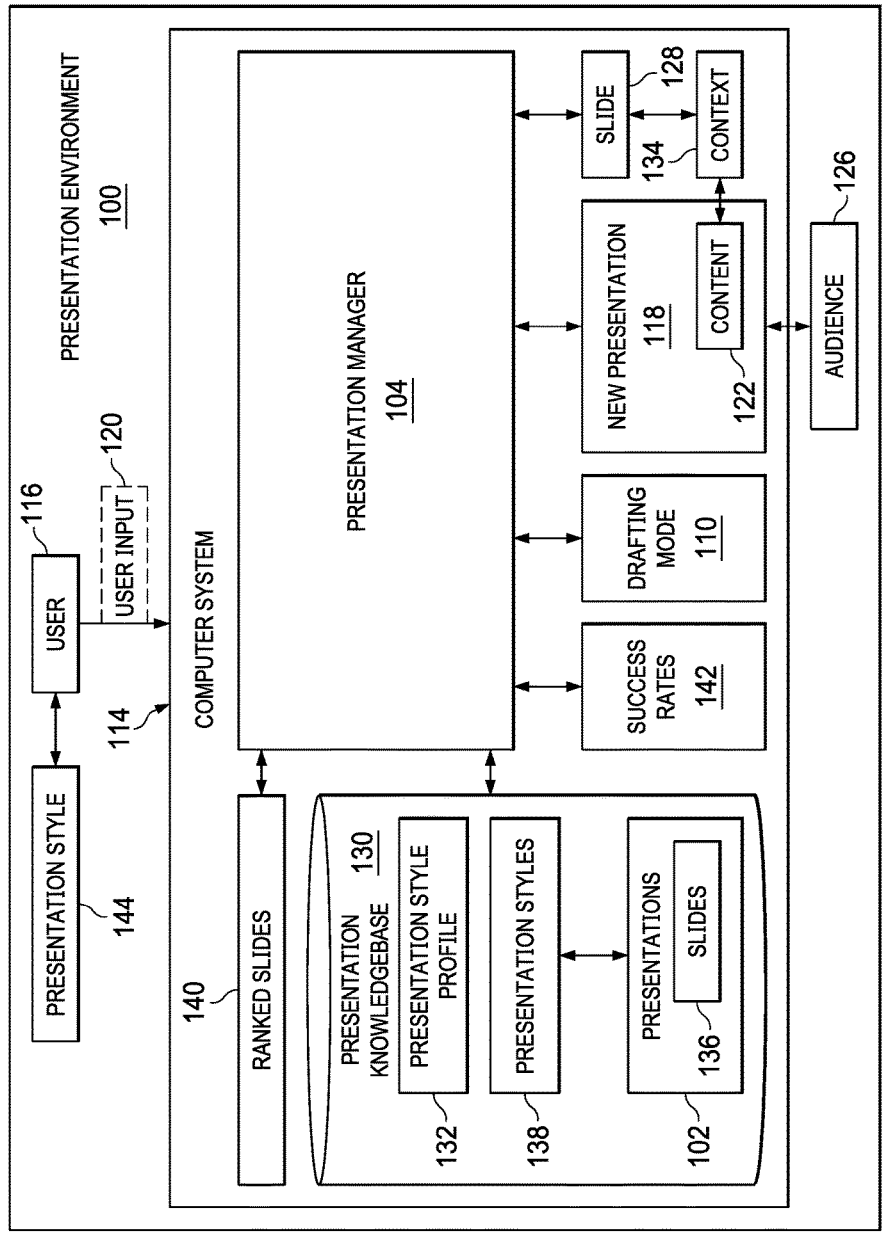
FIG. 1 is an illustration of a block diagram of presentation environment in which a presentation is created in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that it would be desirable to have a method, an apparatus, a system, and a computer program product that overcome a technical problem with creating presentations as well as other possible issues. For example, the illustrative embodiments recognize and take into account that would be desirable to have a method, an apparatus, a system, and a computer program product that provide an ability to leverage previously-presented presentations in creating new presentations. The illustrative embodiments also recognize and take into account that it would be desirable to control the presentation slides during the presentation to an audience. Those embodiments also recognize and take into account that, in answering questions, it would be desirable to be able to identify supporting slides or questions posed by members of the audience.

Thus, the illustrative examples provide a method, an apparatus, a system, and a computer program product for managing presentations. The management of the presentations are performed by a presentation manager in the illustrative examples in one or more modes of operation. For example, the presentation manager may operate in at least one of a learning mode, a drafting mode, and a presenting mode.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to the figures and, in particular, with reference to FIG. 1, an illustration of a block diagram of a presentation environment in which a presentation is created is depicted in accordance with an illustrative embodiment. As depicted, presentation environment 100 is an environment in which presentations 102 can be managed by presentation manager 104.

As depicted, presentation manager 104 is located in computer system 114. Computer system 114 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, presentation manager 104 assists user 116 in creating new presentation 118 while in drafting mode 110. For example, presentation manager 104 receives user input 120 defining content 122 for new presentation 118. In this example, user 116 creates new presentation 118 for audience 126.

Content 122 describes information that user 116 desires to convey to audience 126 through new presentation 118. For example, content 122 can be information about cyber security issues, a rezoning plan, a new website design, an initial public offering, or other suitable information that user 116 desires to convey. Audience 126 comprises the people will receive new presentation 118 from user 116.

In this illustrative example, presentation manager 104 creates slide 128 for new presentation 118 using user input 120, presentation knowledgebase 130, and presentation style profile 132 defining presentation style 144 for user 116. Presentation style profile 132 defines the manner in which user 116 wants a presentation to be formatted or designed. Presentation style profile 132 for user 116 may define preferences such as color schemes, typography preferences, font type, font color, font size, image preferences, video preferences, graphics preferences, and other preferences that are used in creating slides for presentations.

Further, presentation manager 104 defines context 134 for slide 128. Context 134 aids in conveying a meaning intended by user 116 for content 122. For example, context 134 of a slide or of the presentation in its entirety is a statement, or idea (that is, a situation, background information, setting the scene, etc.) in terms of which it can be understood in the frame of a single slide, or the entire presentation. The slide can be taken out of "context" when removed from its original deck, but placed into a new deck.

Examples of context 134 include a slide with an image of a frustrated helpdesk analyst, or text that has a negative sentiment about the issues associated with calling a help desk. The slide could be in a presentation that talks about the challenges with help desk tools (slide context, coupled with the presentation context). The slide could also be put into a presentation that launches a new help desk product or service and is used to depict competitors (slide context, coupled with the presentation context—gives it new meaning).

For example, if user 116 desires to convey frustration with current computer security processes, the presentation style may be used to convey this meaning along with the content. The presentation style may include features such as color, audio, language, and other items to convey the meaning of frustration as part of the presentation.

In the illustrative examples, presentation style includes visual communication methods versus the meaning of the content itself. The presentation style can also include voice, sound, or other audio communication methods as part of the multimedia communication methods that user 116 utilizes. The visual communication can include at least one of graphics, bullets, charts, video, images, animation, or other visual techniques. One illustrative example of a presentation style is a technology, entertainment, and design (TED) style. This presentation style generally uses a large number of graphics and minimal slides or bullet points, as opposed to a "Keynote" presentation style, which is a presentation style that has more bullet points and words.

In the illustrative examples, the context of the presentation is the "spirit" or meaning trying to be communicated from a slide in a presentation or the overall presentation itself. For example, the slides in the presentation can have a context, as well as each slide. In the illustrative examples, presentation manager 104 operates to enable user 116 to more quickly or efficiently choose content for all of the slides in the presentation or specific slides in the presentation. For example, to identify context for a slide or deck overall for user 116, presentation manager 104 can analyze speaker notes, slide content (e.g. bullets, text, graphics), and other information from previous presentations to formulate at least one of insights, trends, relationships, linkages, and other information. With context 134, presentation manager 104 can map the intent of the speaker, as well as the intent of a person in the audience when that person asks a question.

Presentation manager 104 places slide 128 in new presentation 118. Slide 128 is placed in new presentation 118 when user 116 is satisfied with slide 128. For example, user 116 may accept slide 128 as presented by presentation manager 104, make changes to slide 128, or reject slide 128.

In creating slide 128 in drafting mode 110, presentation manager 104 also can take into account audience 126. For example, presentation manager 104 identifies information about audience 126 for new presentation 118. Information about audience 126 may include industry, position, demographics, affiliations, age, class, education level, and other information about the makeup of audience 126. For example, presentation manager 104 may create slide 128 for new presentation 118 using user input 120, presentation knowledgebase 130, presentation style profile 132, and information about audience 126.

Presentation manager 104 can create slide 128 in a number of different ways. For example, slide 128 may be selected from a slide in presentation knowledgebase 130. That selected slide may be presented to user 116 who may make changes or presentation manager 104 who may make changes to the selected slide based on at least one of presentation style profile 132 or audience 126. In locating slide 128, presentation manager 104 ranks slides 136 in presentation knowledgebase 130 based on presentation styles 138 for slides 136 and presentation style profile 132 for user 116 to form ranked slides 140 and displays ranked slides 140. Presentation manager 104 may create ranked slides 140 by ranking slides 136 based on presentation styles 138 for slides 136, presentation style profile 132 for user 116, and success rates 142 for slides 136 with audience 126 for new presentation 118.

Responsive to slide 128 being selected for new presentation 124, presentation manager 104 updates presentation style profile 132 for user 116. Presentation manager 104 also adds slide 128 to presentation knowledgebase 130 in response to slide 128 being selected for new presentation 124.

Figure 2:
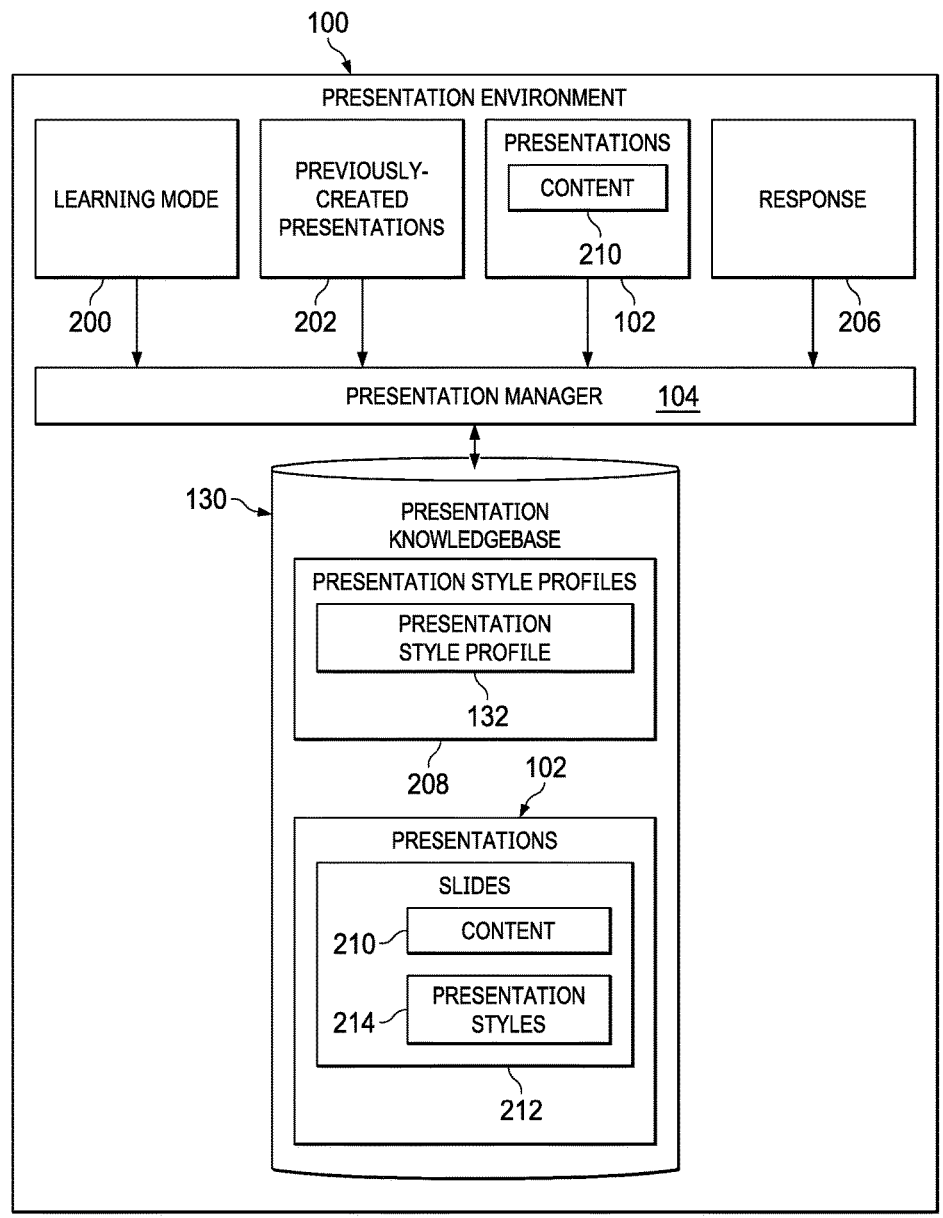
FIG. 2 is an illustration of a block diagram of a learning environment in which a presentation knowledgebase is created in accordance with an illustrative embodiment.

With reference next to FIG. 2, an illustration of a block diagram of a learning environment in which a presentation knowledgebase is created is depicted in accordance with an illustrative embodiment. In the illustrative examples, the same reference numeral may be used in more than one figure. This reuse of a reference numeral in different figures represents the same element in the different figures.

As depicted, presentation manager 104 in presentation environment 100 is in learning mode 200. In this mode, presentation manager 104 operates to create presentation knowledgebase 130 that can be used by user 116 in FIG. 1 to create new presentation 118 in FIG. 1.

In this illustrative example, presentation manager 104 identifies previously-created presentations 202 created by user 116. Further, presentation manager 104 receives response 204 to questions about presentation style 144 in FIG. 1 for user 116. In this example, presentation style profile 132 is created for user 116 by presentation manager 104. Presentation style profile 132 for user 116 is based on at least one of previously-created presentations 202 created by user 116 or response 206 to the questions about presentation style 144 for user 116. Presentation style profile 132 is one of presentation style profiles 208 for other users in presentation knowledgebase 130.

Further, presentation manager 104 identifies content 210 in slides 212 in presentations 102. Additionally, presentation manager 104 maps presentation styles 214 in slides 212 to content 210 identified in slides 212. These components form presentation knowledgebase 130 used by user 116 to create new presentation 118 in FIG. 1 in this illustrative example.

Figure 3:
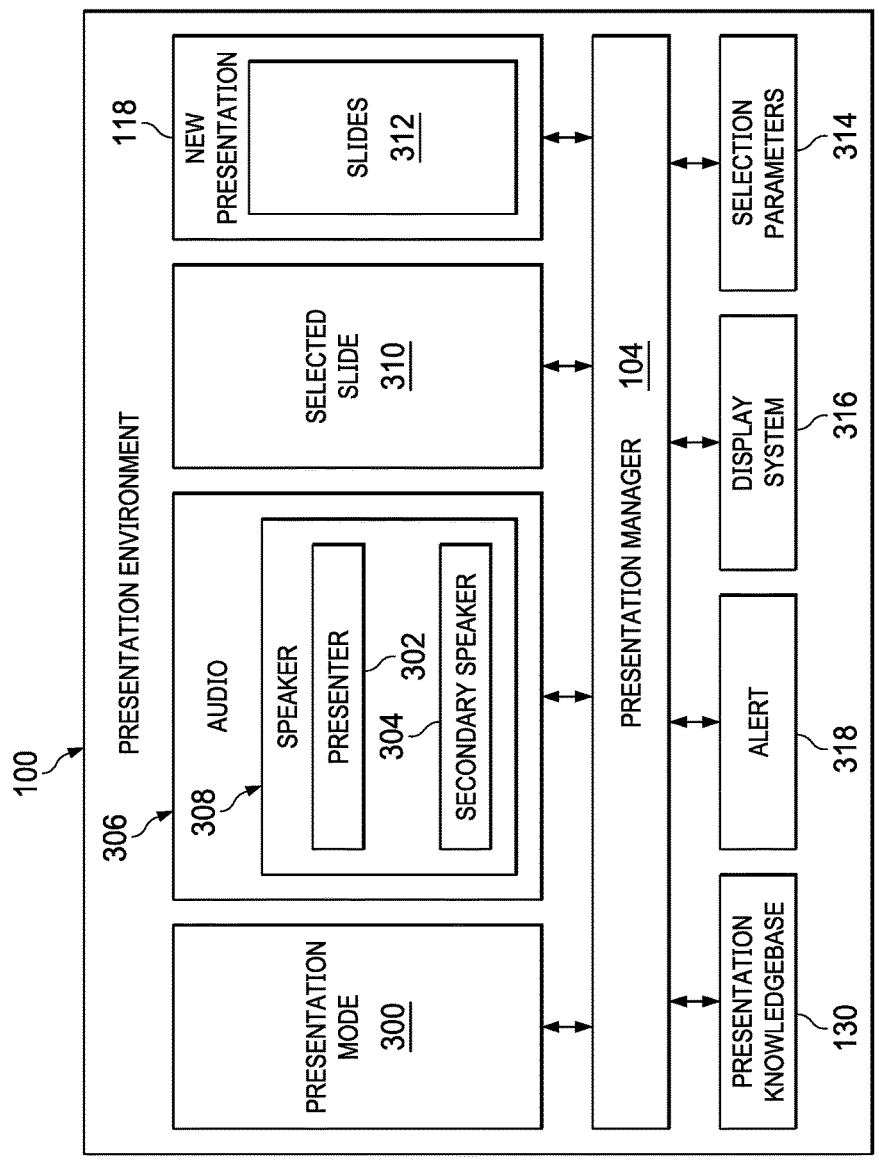
FIG. 3 is an illustration of a block diagram of a presentation environment in which a presentation is created in accordance with an illustrative embodiment.

Turning to FIG. 3, an illustration of a block diagram of a presentation environment in which a presentation is created is depicted in accordance with an illustrative embodiment. As depicted, presentation manager 104 in presentation environment 100 is in presentation mode 300. In this mode, presentation manager 104 operates to aid presenter 302 in displaying a presentation such as new presentation 118 on display system 316. Display system 316 is a physical hardware system and includes one or more display devices on which new presentation 118 can be displayed. The display devices may include at least one of a light emitting diode (LED) display, a liquid crystal display (LCD), an organic light emitting diode (OLED) display, or some other suitable device on which new presentation 118 can be displayed.

In this example, presenter 302 is an example of user 116 in FIG. 1 who created new presentation 118. In other illustrative examples, presenter 302 can be another person other than user 116 that presents new presentation 118 to audience 126 in FIG. 1.

As depicted, presentation manager 104 monitors for audio 306 during presenting of new presentation 118. The presenting of new presentation 118 includes breaks during the presentation, a question-and-answer session, or other periods of time that may occur in addition to the actual display and discussion of slides in new presentation 118.

When audio 306 is detected from at least one of presenter 302 or secondary speaker 304 in audience 126, presentation manager 104 identifies speaker 308 in audio 306. This identification of speaker 308 can be made using a speaker recognition process that is capable of identifying a person from characteristics of voices such as voice biometrics.

For example, presentation manager 104 is configured to identify speaker 308 during the presentation of new presentation 118. Responsive to speaker 308 being presenter 302 of new presentation 118, presentation manager 104 identifies selected slide 310 from slides 312 in new presentation 118 based on a set of selection parameters 314 identified from presenter 302 speaking. Presentation manager 104 displays selected slide 310 on display system 316.

In this manner, presentation manager 104 is configured to aid presenter 302 in presenting new presentation 118 to audience 126. It becomes unnecessary for another person to aid presenter 302 or learn new presentation 118 to know when to display different slides. Further, based on selection parameters 314, selected slide 310 may be displayed out of order from other slides in slides 312.

In another example, presentation manager 104 identifies selected slide 310 based on a set of selection parameters 314 identified from secondary speaker 304 in response to speaker 308 in audio 306 being secondary speaker 304 in audience 126. In this instance, presentation manager 104 generates alert 318 about selected slide 310. In this illustrative example, selected slide 310 is from one of new presentation 118 and presentation knowledgebase 130.

In the different illustrative examples, presentation manager 104 can be implemented in software, hardware, firmware, or a combination thereof. Presentation manager 104 can be comprised of at least one of an artificial intelligence system, a neural network, a hybrid neural network, a fuzzy logic system, a Bayesian network, a genetic algorithm system, an automated reasoning system, a natural language processing system, or a question-answering system.

When software is used, the operations performed by presentation manager 104 can be implemented in program code configured to run on hardware, such as a processor unit. When firmware is used, the operations performed by presentation manager 104 can be implemented in program code and data and stored in persistent memory to run on a processor unit. When hardware is employed, the hardware may include circuits that operate to perform the operations in presentation manager 104.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As a result, computer system 114 in FIG. 1 operates as a special purpose computer system in which presentation manager 104 in computer system 114 enables managing presentations. This management of presentations includes at least one of creating a database of the presentation such as presentation knowledgebase 130, creating presentations, or presenting presentations in a manner that is more efficient and more effective than currently-available systems. In particular, presentation manager 104 transforms computer system 114 into a special purpose computer system as compared to currently-available general computer systems that do not have presentation manager 104.

The illustration of presentation environment 100 and the different components in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although presentation manager 104 is shown as a single component, different options and modes in presentation manager 104 may be implemented in different components other than as a single block as shown in the different examples.

For example, presentation manager 104 in presentation environment 100 is shown and described as creating presentation knowledgebase 130 in learning mode 200. However, presentation knowledgebase 130 can be created by other processes or components, in addition to or in place of presentation manager 104.

Figure 4:
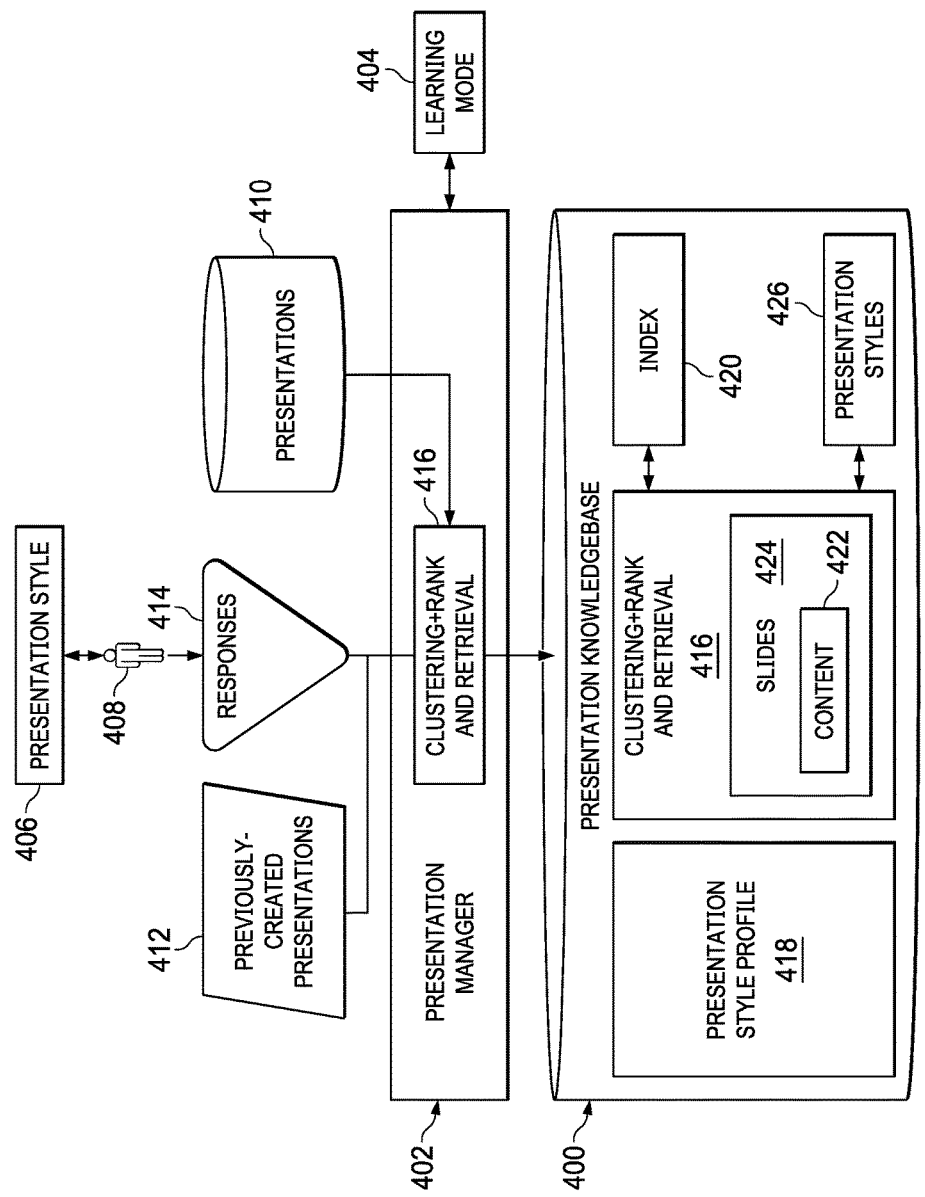
FIG. 4 is an illustration of a block diagram of a data flow for creating a knowledge base in accordance with an illustrative embodiment.

With reference to FIG. 4, an illustration of a block diagram of a data flow for creating a knowledgebase is depicted in accordance with an illustrative embodiment. In this depicted example, a data flow for creating presentation knowledgebase 400 by presentation manager 402 in learning mode 404 is shown. In this illustrative example, presentation manager 402 is implemented in an artificial intelligence process. For example, presentation manager 402 and the different components described in presentation manager 402 can be implemented using at least one of an artificial intelligence system, a neural network, a hybrid neural network, a fuzzy logic system, a Bayesian network, a genetic algorithm system, an automated reasoning system, a natural language processing system, a question-answering system, or some other suitable type of system.

As depicted, presentation style 406 of user 408 is identified and presentations 410 are analyzed in the data flow to create presentation knowledgebase 400. This analysis by presentation manager 402 can be performed using previously-created presentations 410 created by user 408 and responses 414 from user 408 with respect to presentation style-related questions. These inputs are analyzed using clustering+rank and retrieval 416 in presentation manager 402 to create presentation style profile 418 for user 408. In one illustrative example, clustering+rank and retrieval 416 can be implemented using K-means clustering. This analysis can be used to identify preferences for user 408 in creating presentations 410. For example, this analysis can identify preferences such as whether the user likes bullets, animation, videos, file type, audio, or other types of presentations features for creating presentations 410.

Additionally, presentations 410 also can be processed utilizing clustering+rank and retrieval 416. This analysis can create index 420 for content 422 in slides 424 in presentations 410. Additionally, the analysis also can map presentation styles 426 to content 422 in slides 424 in presentations 410. As a result, presentation knowledgebase 400 is an indexed knowledgebase.

Figure 5:
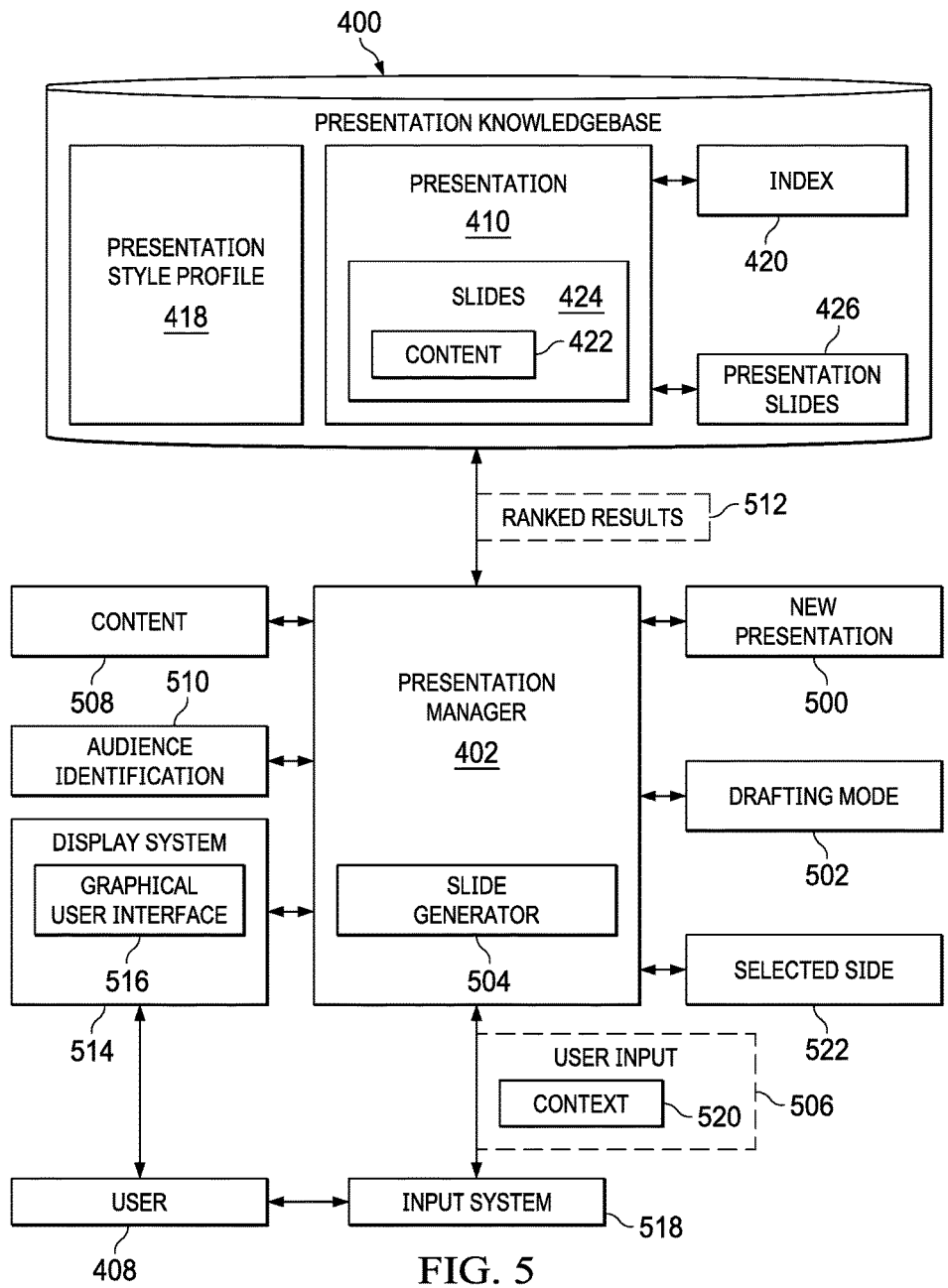
FIG. 5 is an illustration of a block diagram of a data flow for creating a new presentation in accordance with an illustrative embodiment.

With reference next to FIG. 5, an illustration of a block diagram of a data flow for creating a new presentation is depicted in accordance with an illustrative embodiment. In this illustrative example, a data flow for creating new presentation 500 by user 408 interacting with presentation manager 402 in drafting mode 502 is shown.

As depicted, slide generator 504 receives user input 506 from user 408 to create new presentation 500 using graphical user interface 516 displayed on display system 514 and user input 506 generated by input system 518. Input system 518 is a physical hardware system and may be selected from at least one of a mouse, a keyboard, a trackball, a touchscreen, a stylus, a motion-sensing input device, a cyber glove, or some other suitable type of input device. User input 506 can identify content 508. User 408 may identify content 508 and context 520 for a slide in new presentation 500. User input 506 may be voice audio input or text through user 408 operating input system 518.

In the illustrative example, slide generator 504 queries presentation knowledgebase 400. The query made by slide generator 504 in this particular example includes an identification of presentation style profile 418 for user 408, content 508, and audience identification 510. In response, presentation knowledgebase 400 returns ranked results 512. Ranked results 512 is a ranking of slides 424 and presentations 410 in presentation knowledgebase 400.

Ranked results 512 includes a number of slides 424 that are displayed to user 408. The number of slides 424 can vary in different illustrative examples. For example, the number of slides 424 may be one, five, seven, 11, 17, or some other number of slides 424.

In ranking slides 424, presentation style profile 418 is used to identify slides 424 that most closely correspond to preferences of user 408 in the presentation style for the user as defined in presentation style profile 418. For example, the ranking may be based upon preferred color schemes, font size, image preferences, video preferences, graphics preferences, and other preferences that are used in creating slides for presentations as indicated as preferences for user 408 in presentation style profile 418.

In addition, ranked results 512 also can place slides 424 in order based on how successful particular slides are with audience 126 in FIG. 1 to which new presentation 500 is to be presented. The success may be based on the various characteristics of audience. These characteristics include, for example, demographics, industry, education, age, geographical location, or other suitable characteristics about people in the target audience for new presentation 500. The amount of influence of each of these inputs may be reflected through weighting. This weighting can be indicated by user 408 or by slide generator 504 in presentation knowledgebase 400.

As depicted, ranked results 512 are displayed by slide generated 504 on display system 514 to user 408. User 408 can interact with slide generator 504 utilizing graphical user interface 516 and user input 506 generated by input system 518. In this illustrative example, user input 506 can be used to select a slide from ranked results 512, modify a slide, or perform some other action. Depending on context 520 desired by user 408, at least one of user 408 or slide generator 504 can modify context 520 of one or more slides in ranked results 512.

When user 408 selects selected slide 522, this slide can be used to update presentation style profile 418 for user 408. An update can be made when new information is identified in selected slide 522 about presentation style 406 for user 408. Additionally, selected slide 522 also can be added to presentation knowledgebase 400. Further, slides not selected by user 408 can also be added to presentation knowledgebase 400.

Figure 6:
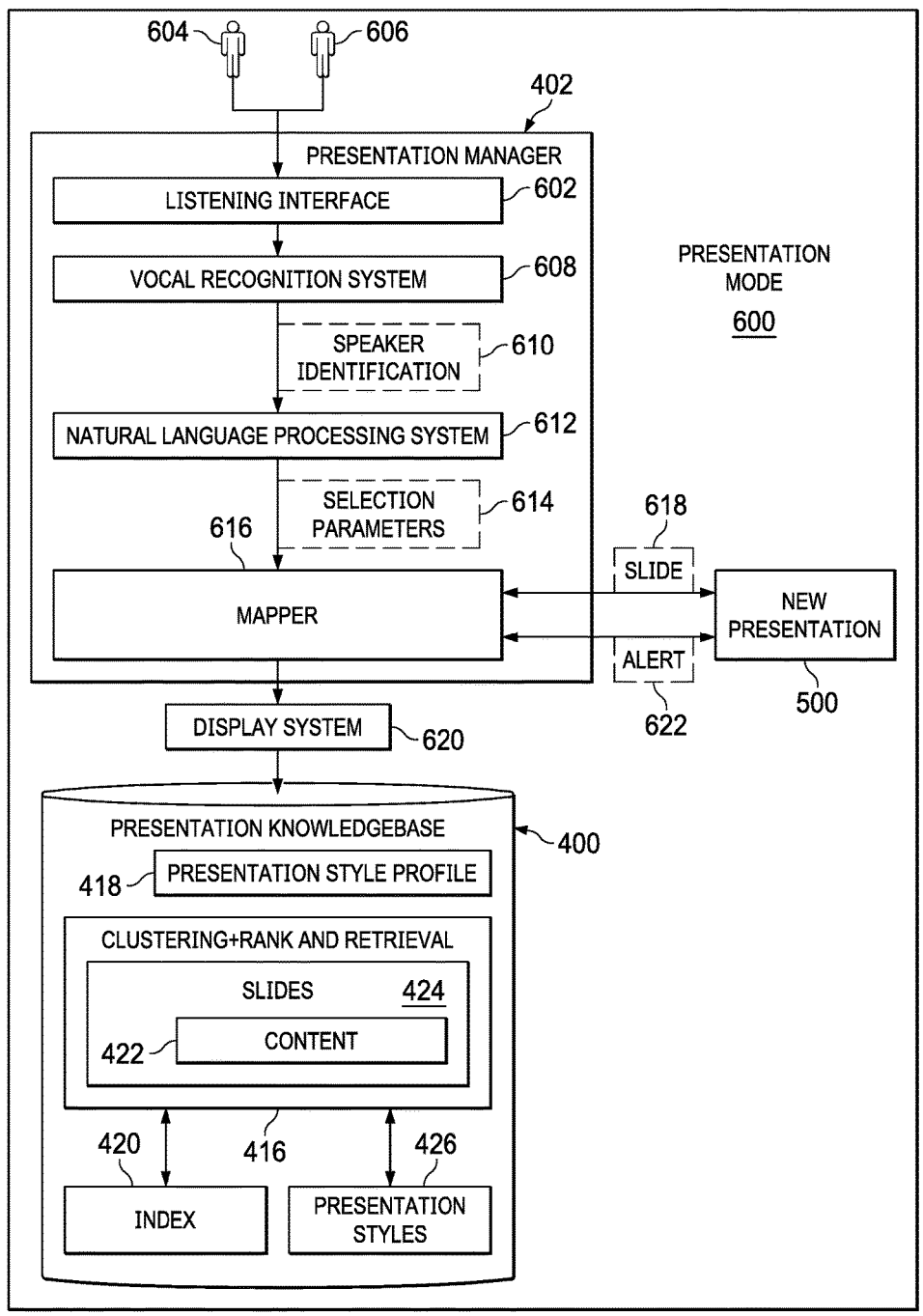
FIG. 6 is an illustration of a block diagram of a data flow for presenting a presentation in accordance with an illustrative embodiment.

With reference next to FIG. 6, an illustration of a block diagram of a data flow for presenting a presentation is depicted in accordance with an illustrative embodiment. In this illustrative, data flow for presenting new presentation 500 by created user 408 in FIG. 5 is shown.

As depicted, listening interface 602 in presentation manager 402 monitors for audio from a speaker such as presenter 604 or secondary speaker 606 in the audience. When audio is detected by listening interface 602, vocal recognition system 608 in presentation manager 402 identifies the speaker. The illustrative example, this component includes natural language processing and voice-recognition processes that can be used to identify particular speakers such as presenter 604 or secondary speaker 606. As depicted, natural language processing system 612 and vocal recognition system 608 outputs speaker identification 610.

If the speaker is identified as presenter 604 in speaker identification 610, natural language processing system 612 in presentation manager 402 identifies selection parameters 614. In this example, selection parameters 614 may be selected from at least one of an entity, a category, a context, or other suitable types of selection parameters. In one example, the entity may be a security analyst, the category may be cyber security, and the context may be an emotion such as frustration.

With selection parameters 614, mapper 616 identifies slide 618 in new presentation 500 and displays the slide on display system 620. In this manner, presentation manager 402 provides aid to presenter 604 in presenting new presentation 500 to an audience. This presentation of slides in new presentation 500 can be in order or out of order depending on input received from presenter 604.

When speaker identification 610 is for secondary speaker 606 and the audience, mapper 616 identifies slide 618 in new presentation 500 for a slide in presentation knowledgebase 400. In this manner, presentation manager 402 is configured to aid presenter 604 in question-and-answer sessions during presentation mode 600. In this example, mapper 616 can generate alert 622 to indicate to presenter 604 that slide 618 may provide the answer to a question or other comment from secondary speaker 606. In other illustrative examples, depending on the confidence in the selection of slide 618, mapper 616 may display slide 618.

Figure 7:
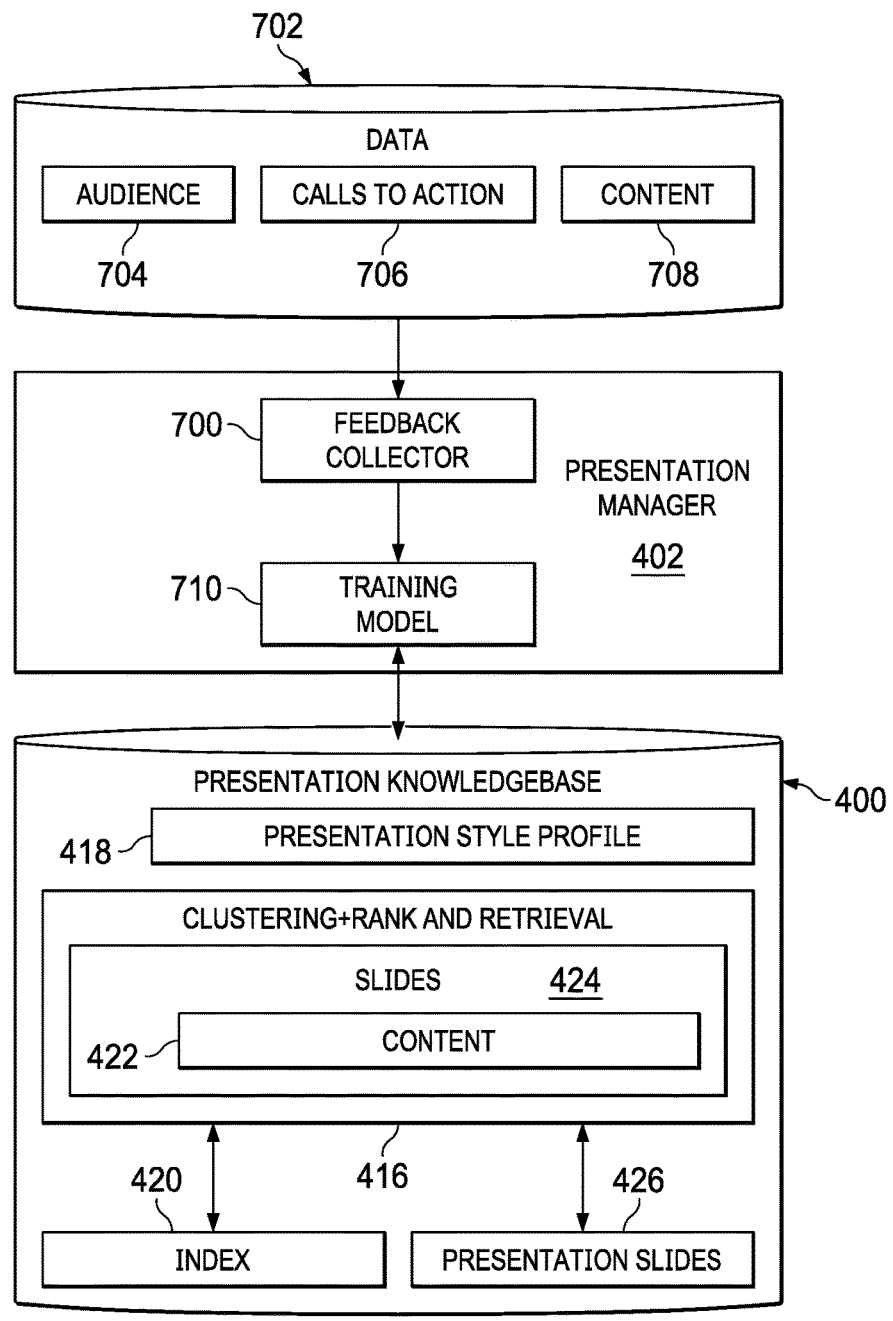
FIG. 7 is an illustration of dataflow for training a presentation knowledgebase in accordance with an illustrative embodiment.

With reference next to FIG. 7, an illustration of a block diagram of a data flow for training a presentation knowledgebase is depicted in accordance with an illustrative embodiment. The process illustrated in this figure can be implemented in presentation manager 402 in FIG. 4.

In this illustrative example, feedback collector 700 in presentation manager 402 collects data 702 for feedback about new presentation 500. As depicted, data 702 includes an identification of audience 704, calls to action 706, and content 708. Calls to action 706 may be, for example, a request for proposal, an email message, a call back for more discussions, a request for a meeting, or some other action that indicates that new presentation 500 was liked by audience 704. This data is sent to training model 710 in presentation manager 402. As depicted, training model 710 may be a training process for an artificial intelligence system. In this illustrative example, training model 710 trains or updates presentation knowledgebase 400 using data 702.

The illustrations of these data flows in FIGS. 4-7 are provided as one manner in which a presentation knowledgebase can be managed. These illustrations are not meant to limit the manner in which a presentation knowledgebase can be managed in other examples. For example, the presenter or some other user can identify a speaker for the presentation manager in some illustrative examples rather than using a voice recognition system. A natural language processing system can still be used to process the audio to identify slides after the speaker has been identified the presenter or some other user.

Figure 8:
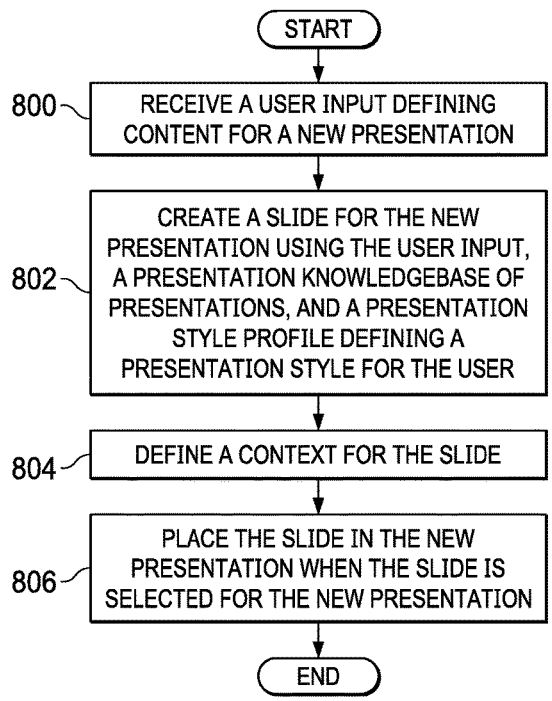
FIG. 8 is an illustration of a flowchart of a process for managing presentations in accordance with an illustrative embodiment.

Turning next to FIG. 8, an illustration of a flowchart of a process for managing presentations is depicted in accordance with an illustrative embodiment. The steps illustrated in the flowchart in FIG. 8 can be implemented as at least one of software or hardware. These steps can be implemented in presentation manager 104 in FIGS. 1-2 and presentation manager 402 in FIGS. 4-5. The steps can be performed as part of a drafting mode for a presentation manager. In another illustrative example, when the speaker is presenter 604, mapper 616 generates alert 622 to prompt presenter 604 for input as to whether to display slide 618 in FIG. 6.

The process begins by receiving a user input defining content for a new presentation (step 800). The process creates a slide for the new presentation using the user input, a presentation knowledgebase of presentations, and a presentation style profile defining a presentation style for the user (step 802). The process defines a context for the slide (step 804). The context aids in conveying a meaning intended by the user for the content.

The process places the slide in the new presentation when the slide is selected for the new presentation (step 806). The process terminates thereafter. In this example, responsive to the slide being selected for the new presentation, the presentation style profile is updated for the user to reflect changes in the presentation style for the user. The process also can add the slide to the presentation knowledgebase.

Figure 9:
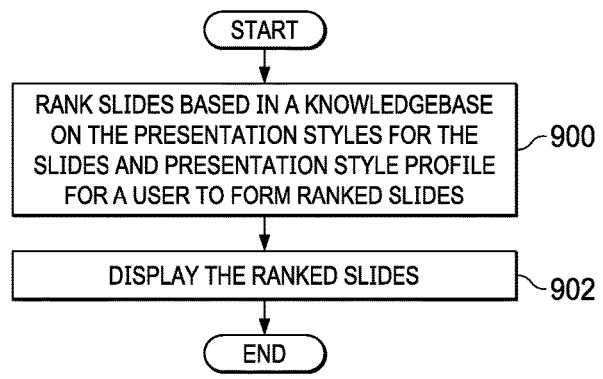
FIG. 9 is an illustration of a flowchart of a process for creating a slide in accordance with an illustrative embodiment.

With reference to FIG. 9, an illustration of a flowchart of a process for creating a slide is depicted in accordance with an illustrative embodiment. The process is one example of how step 802 in FIG. 8 can be implemented.

The process begins by ranking slides based in a knowledgebase on presentation styles for the slides and the presentation style profile for a user to form ranked slides (step 900). The ranking can also be based on success rates for the slides for an audience for the new presentation.

The process displays the ranked slides (step 902). The display of the ranked slides in step 902 can be a portion of the slides. The number of slides displayed may vary depending on the particular implementation. The process terminates thereafter.

Figure 10:
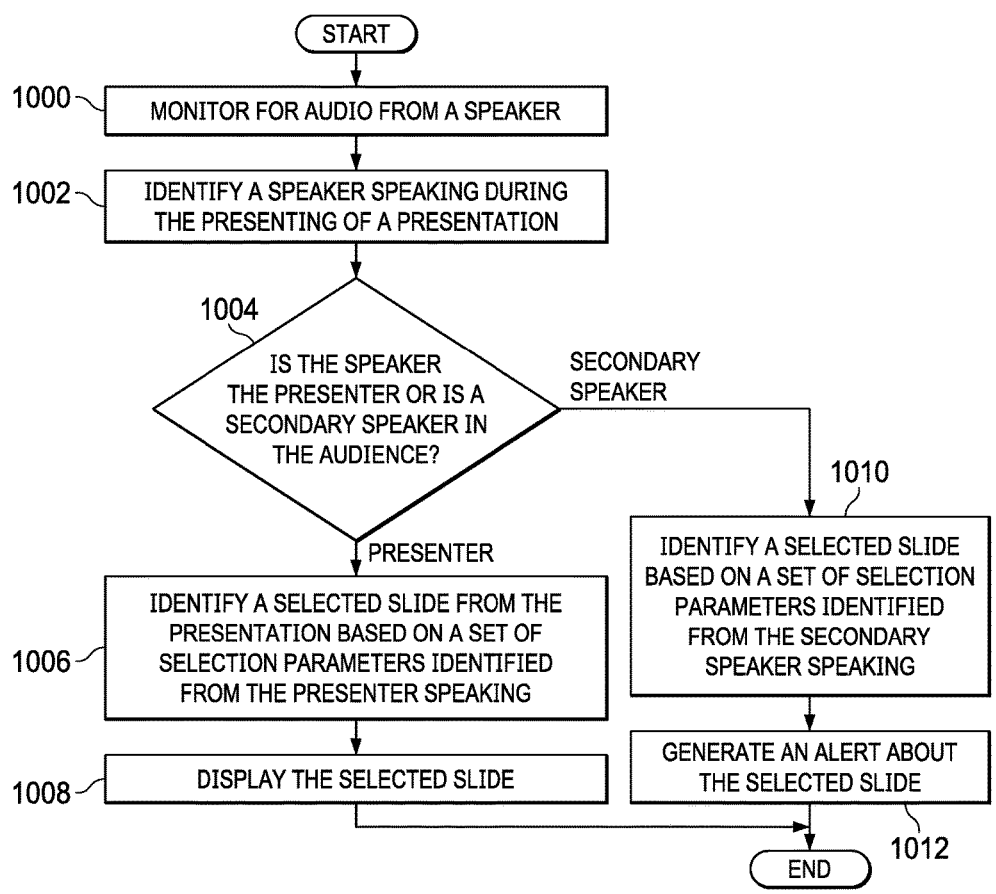
FIG. 10 is an illustration of a flowchart of process for presenting a presentation in accordance with an illustrative embodiment.

With reference next to FIG. 10, an illustration of a flowchart of a process for presenting a presentation is depicted in accordance with an illustrative embodiment. The steps illustrated in the flowchart in FIG. 10 can be implemented as at least one of software or hardware. These steps can be implemented in presentation manager 104 in FIGS. 1-2 and in presentation manager 402 in FIGS. 4-5. The steps can be performed as part of a presenting mode for a presentation manager.

The process begins by monitoring for audio from a speaker (step 1000). Step 1000 is performed while presenting a presentation to an audience. The process identifies the speaker speaking during presenting of a presentation (step 1002). A determination is made as to whether the speaker is the presenter or a secondary speaker in the audience (step 1004). Responsive to the speaker being the presenter of the presentation, the process identifies a selected slide from the presentation based on a set of selection parameters identified from the presenter speaking (step 1006).

The process displays the selected slide (step 1008). The process terminates thereafter. This process may be performed any number of times while presenting a presentation.

With reference again to step 1004, if the speaker is a secondary speaker in the audience, the presentation manager identifies a selected slide based on a set of selection parameters identified from the secondary speaker speaking (step 1010). Identification of the selected slide in this example may be made from at least one of the slides in the presentation for the audience or one or more other presentation knowledge bases.

The process generates an alert about the selected slide (step 1012). The process terminates thereafter. The alert provides the presenter an ability to determine whether to show the selected slide. This alert may be selected from at least one of a private display of the slides to the presenter, a verbal queue, a sound, or some other suitable type of alert.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
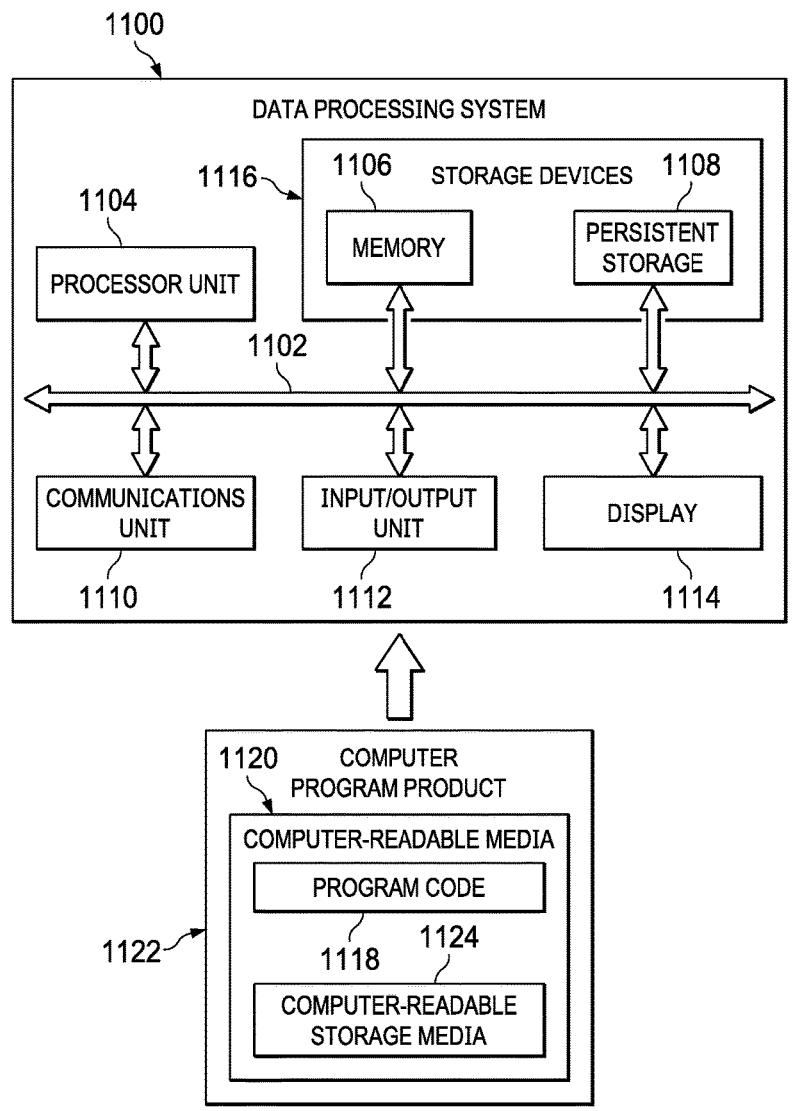
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 114 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In this example, computer-readable media 1120 is computer-readable storage media 1124. In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, illustrative embodiments of the present invention provide a computer implemented method, computer system, and computer program product for managing presentations. In the illustrative examples, a computer operates as a special purpose computer system in which a presentation manager in computer system enables managing presentations. This management presentations includes at least one of creating a database of presentation such as presentation knowledgebase 130, creating presentations, or presenting presentations in a manner that is more efficient and more effective than currently available system. In particular, the presentation manager transforms computer system into a special purpose computer system as compared to currently available general computer systems that do not have presentation manager. In the illustrative examples, the knowledge base provides a resource organized in a manner that increases the ease at which a user can create, present, or create and present presentations to different audiences.

Further, with the presentation manager in the illustrative examples, slides in any presentation can be created in a consistent manner such that each slide in the presentation feels like part of the same story that is being told. This type of presentation may occur through presentation styles that apply the same or related typography, colors, imagery, or other visual features across the slides in the presentation. Thus, the illustrative examples, enable automatically switching the slides when the speaker presents the presentation and enables identifying the slide that is being discussed during a question and answer session.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing presentations, the method comprising:
   receiving, at a presentation manager in a drafting mode in a computer system, a user input defining content for a new presentation;
   creating, by the presentation manager in the drafting mode in the computer system, a slide for the new presentation using the user input, a presentation knowledgebase of presentations, and a presentation style profile defining a presentation style for a user;
   defining, by the presentation manager in the drafting mode in the computer system, a context for the slide, wherein the context aids in conveying a meaning intended by the user for the content;
   placing, by the presentation manager in the drafting mode in the computer system, the slide in the new presentation;
   identifying previously-created presentations created by the user;
   receiving responses to questions about the presentation style for the user; and
   creating the presentation style profile for the user based on the previously-created presentations by the user and the responses to the questions about the presentation style for the user.

2. The method of claim 1 further comprising:
   identifying, by the presentation manager in the drafting mode in the computer system, information about an audience for the new presentation; and
   wherein creating, by the presentation manager in the drafting mode in the computer system, the slide for the new presentation using the user input using the presentation knowledgebase and the presentation style profile for the user comprises:
   creating, by the presentation manager in the drafting mode, the slide for the new presentation using the user input, the presentation knowledgebase, the presentation style profile, and the information about the audience.

3. The method of claim 1 further comprising:
   responsive to the slide being selected for the new presentation, updating, by the presentation manager in the drafting mode, the presentation style profile for the user; and
   adding, by the presentation manager in the drafting mode, the slide to the presentation knowledgebase.

4. The method of claim 1 further comprising:
   identifying the content in slides in the presentations; and
   mapping presentation styles in the slides to the content identified to form the presentation knowledgebase.

5. The method of claim 1, wherein creating, by the presentation manager in the drafting mode, the slide for the presentation using the user input using the presentation knowledgebase and the presentation style profile defining a presentation style for the user comprises:

ranking, by the presentation manager in the drafting mode, the slides based on the presentation styles for the slides and the presentation style profile for the user to form ranked slides; and displaying, by the presentation manager in the drafting mode, the ranked slides.

6. The method of claim 5, wherein ranking, by the presentation manager in the drafting mode, the slides based on the presentation styles for the slide and the presentation style profile for the user comprises:

ranking, by the presentation manager in the drafting mode, the slides based on the presentation styles for the slides, the presentation style profile for the user, and success rates for the slides with an audience for the new presentation.

7. The method of claim 1, wherein the presentation manager is comprised of at least one of an artificial intelligence system, a neural network, a hybrid neural network, a fuzzy logic system, a Bayesian network, a genetic algorithm system, an automated reasoning system, a natural language processing system, and a question answering system.

8. A method for managing presentations, the method comprising:

receiving, at a presentation manager in a drafting mode in a computer system, a user input defining content for a new presentation;

creating, by the presentation manager in the drafting mode in the computer system, a slide for the new presentation using the user input, a presentation knowledgebase of presentations, and a presentation style profile defining a presentation style for a user;

defining, by the presentation manager in the drafting mode in the computer system, a context for the slide, wherein the context aids in conveying a meaning intended by the user for the content;

placing, by the presentation manager in the drafting mode in the computer system, the slide in the new presentation;

identifying, by the presentation manager in a presenting mode, a speaker speaking during presenting of the new presentation;

responsive to the speaker being a presenter of the new presentation, identifying, by the presentation manager in the presenting mode, a selected slide from the new presentation based on a set of selection parameters identified from the presenter speaking; and displaying, by the presentation manager in the presenting mode, the selected slide.

9. A method for managing presentations, the method comprising:

receiving, at a presentation manager in a drafting mode in a computer system, a user input defining content for a new presentation;

creating, by the presentation manager in the drafting mode in the computer system, a slide for the new presentation using the user input, a presentation knowledgebase of presentations, and a presentation style profile defining a presentation style for a user;

defining, by the presentation manager in the drafting mode in the computer system, a context for the slide, wherein the context aids in conveying a meaning intended by the user for the content;

placing, by the presentation manager in the drafting mode in the computer system, the slide in the new presentation;

identifying, by the presentation manager in a presenting mode, a speaker speaking during presenting of the new presentation;

responsive to the speaker being a secondary speaker in an audience, identifying, by the presentation manager in the presenting mode, a selected slide based on a set of selection parameters identified from the secondary speaker speaking; and generating an alert, by the presentation manager in the presenting mode, about the selected slide, wherein the selected slide is from one of the new presentation and the presentation knowledgebase.

10. A cognitive presentation system comprising:

a computer system; and a presentation manager running on the computer system in a drafting mode that receives a user input defining content for a new presentation; creates a slide for the new presentation using the user input using a presentation knowledgebase and a presentation style profile defines a presentation style for the user; defines a context for the slide, wherein the context aids in conveying a meaning intended by a user for the content; and places the slide in the new presentation, wherein the presentation manager in a mode drafting identifies previously-created presentations by the user; receives responses to questions about the presentation style for the user; and creates the presentation style profile for the user based on the previously-created presentations by the user and the responses to the questions about the presentation style for the user; identifies the content in slides in the presentations; and maps presentation styles in the slides to the content identified to form the presentation knowledgebase.

11. The cognitive presentation system of claim 10, wherein the presentation manager in the drafting mode identifies information about an audience for the new presentation; and in creating the new presentation using the user input using the presentation knowledgebase and the presentation style profile defining the presentation style for the user, the presentation manager creates the slide for the new presentation using the user input using the presentation knowledgebase, the presentation style profile, and information about the audience.

12. The cognitive presentation system of claim 10, wherein creating the slide for the presentation using the user input using the presentation knowledgebase of presentations and the presentation style profile defining the presentation style, the presentation manager ranks the slides based on the presentation styles for slides, the presentation style profile for the user to form ranked slides, and a success for the slides with an audience for the new presentation, and displays the ranked slides.

13. A cognitive presentation system comprising:

a computer system; and a presentation manager running on the computer system in a drafting mode that receives a user input defining content for a new presentation; creates a slide for the new presentation using the user input using a presentation knowledgebase and a presentation style profile defines a presentation style for the user; defines a context for the slide, wherein the context aids in conveying a meaning intended by a user for the content and places the slide in the new presentation, wherein the presentation manager in a presenting mode identifies a speaker speaking during presenting of a presentation, responsive to the speaker being a presenter of the new presentation, identifies a selected slide from the new presentation based on a set of selection parameters identified from the presenter speaking and displays the selected slide; and responsive to the speaker being a secondary speaker in an audience, identifies the selected slide based on the set of selection parameters identified from the secondary speaker speaking, and generates an alert about the selected slide, wherein the selected slide is from one of the new presentation and the presentation knowledgebase.

14. A computer program product for managing presentations, the computer program product comprising:
   a computer-readable storage media;
   first program code, stored on the computer-readable storage media, for receiving a user input defining content for a new presentation;
   second program code, stored on the computer-readable storage media, for creating a slide for the new presentation using the user input, a presentation knowledgebase, and a presentation style profile defining a presentation style for a user;
   third program code, stored on the computer-readable storage media, for defining a context for the slide, wherein the context aids in conveying a meaning intended by the user for the content;
   fourth program code, stored on the computer-readable storage media, for placing the slide in the new presentation;
   fifth program code, stored on the computer-readable storage media, for identifying previously-created presentations by the user; and
   sixth program code, stored on the computer-readable storage media, for receiving responses to questions about the presentation style for the user; and creates the presentation style profile for the user based on the previously-created presentations by the user and the response to the questions about the presentation style for the user.

15. The computer program product of claim 14 further comprising:
   fifth program code, stored on the computer-readable storage media, for identifying information about an audience for the new presentation; and
   wherein the second program code comprises:
      program code, stored on the computer-readable storage media, for creating the slide for the new presentation using the user input using the presentation knowledgebase, the presentation style profile, and the information about the audience.

16. The computer program product of claim 14 further comprising:
   seventh program code, stored on the computer-readable storage media, for identifying content in slides in the presentations; and
   eighth program code, stored on the computer-readable storage media, for mapping presentation styles in the slides to the content identified to form the presentation knowledgebase.

17. The computer program product of claim 14, wherein the second program code comprises:
   program code, stored on the computer-readable storage media, for ranking the slides based on the presentation styles for the slides, the presentation style profile for the user to form ranked slides, and success for the slides with an audience for the new presentation, and
   program code, stored on the computer-readable storage media, for displaying the ranked slides.

18. A computer program product for managing presentations, the computer program product comprising:
   a computer-readable storage media;
   first program code, stored on the computer-readable storage media, for receiving a user input defining content for a new presentation;
   second program code, stored on the computer-readable storage media, for creating a slide for the new presentation using the user input, a presentation knowledgebase, and a presentation style profile defining a presentation style for a user;
   third program code, stored on the computer-readable storage media, for defining a context for the slide, wherein the context aids in conveying a meaning intended by the user for the content;
   fourth program code, stored on the computer-readable storage media, for placing the slide in the new presentation;
   fifth program code, stored on the computer-readable storage media, for identifying a speaker speaking during presenting of the presentation;
   sixth program code, stored on the computer-readable storage media, responsive to the speaker being the presenter of the new presentation, for identifying a selected slide from the new presentation based on a set of selection parameters identified from the presenter speaking and displaying the selected slide; and
   seventh program code, stored on the computer-readable storage media, responsive to the speaker being a secondary speaker in an audience, for identifying the selected slide based on the set of selection parameters identified from the secondary speaker speaking and generates an alert about the selected slide, wherein the selected slide is from one of the new presentation and the presentation knowledgebase.

* * * * *